June 19, 1951 P. J. KURILO 2,557,442
VENTILATOR

Filed Jan. 2, 1948 2 Sheets-Sheet 1

PAUL J. KURILO
INVENTOR.

BY James D. Girman
ATT'Y

June 19, 1951     P. J. KURILO     2,557,442
VENTILATOR

Filed Jan. 2, 1948     2 Sheets-Sheet 2

PAUL J. KURILO
INVENTOR.

BY James O. Girnan
ATTY

Patented June 19, 1951

2,557,442

UNITED STATES PATENT OFFICE 2,557,442

VENTILATOR

Paul J. Kurilo, Portland, Oreg.

Application January 2, 1948, Serial No. 37

1 Claim. (Cl. 98—2)

This invention relates to improvements in ventilating means for enclosed bodies of vehicles, such as automobiles, the drivers' cabs of trucks, and the like.

It is one of the principal objects of the invention to provide an apertured and vertically disposed plate attached as a permanent fixture to the window frame of the vehicle body which will permit of free circulation of air through the body with the windows partially opened, and the doors locked.

A further object is to provide means of this character for cooling the interior of a vehicle body, or at least preventing an excessive rise in temperature therein when the vehicle is parked in the sunlight or in other warm temperatures.

A still further object is the provision of a ventilator of this character which is of simple and inexpensive construction and readily adaptable to all types of window frames now commonly used in vehicles.

A still further object is the provision of a ventilator which will fully protect the top edge of an opened window against a prying tool, wire, or the like as sometimes used by automobile thieves in an attempt to enter a locked vehicle. The construction and disposition of the ventilators is such that the interior of the vehicle while in motion may be ventilated and its interior at the same time protected against the entering of insects and other foreign matter.

These and other objects will appear as my invention is more fully hereinafter described in the following specification, illustrated in the accompanying drawings and finally pointed out in the appended claim.

Figure 1:
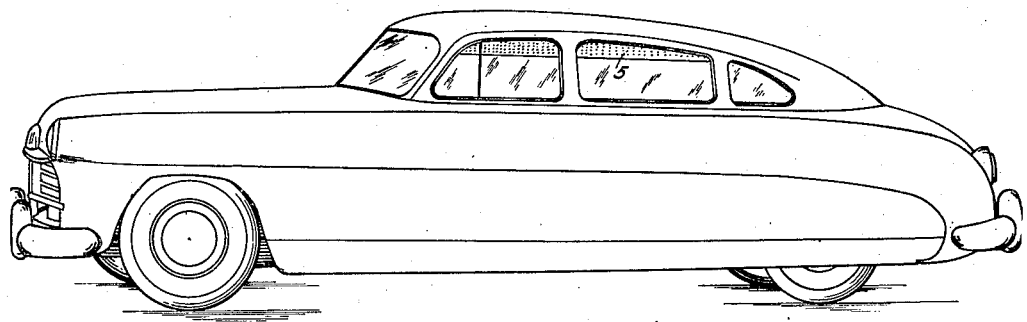
Figure 1 is a side elevation of a vehicle showing ventilators made in accordance with my invention applied to certain window frames thereof.
Figure 2:
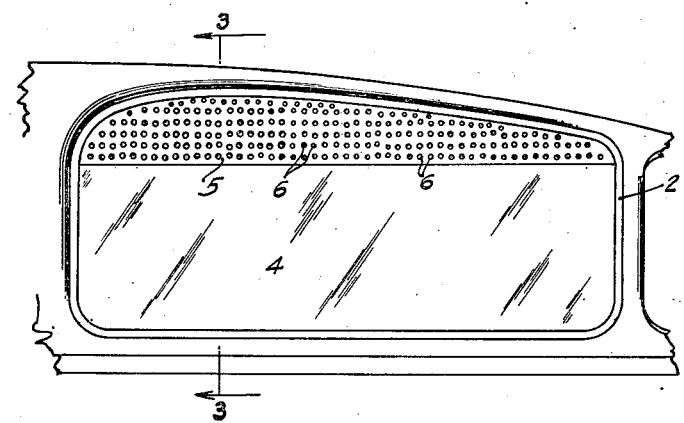
Figure 2 is an enlarged fragmentary side elevation of the center window illustrated in Figure 1.
Figures 3, 4:
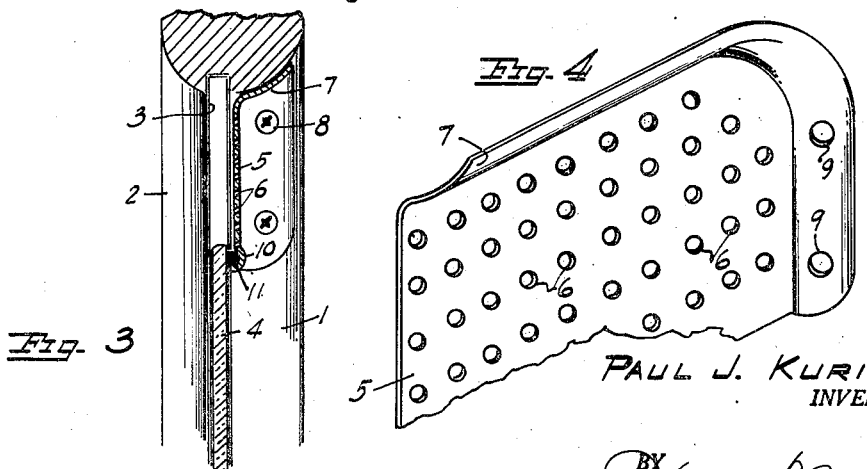
Figure 3 is an enlarged sectional view taken approximately along the line 3—3 of Figure 2.
Figure 4 is an enlarged fragmentary perspective view of the ventilator.

Referring now more particularly to the drawings:

As best illustrated in Figure 3, a vehicle window frame usually comprises an inner molding 1 spaced apart from the outside surface 2 of the frame. The space between the molding and the frame is provided with a lining 3 to render the window 4 water tight, rattle-proof and substantially air tight in any position.

The ventilator proper consists of a plate 5 formed with spaced apart and downwardly and outwardly inclined apertures 6 throughout its length and width. The length of the plate is substantially equal to the inside length of the window frame to which it is attached. The two end and top edges of the plate are curved outwardly and upwardly as indicated at 7 in Figures 3 and 4, to conform with the window molding on the interior of the frame to which it is attached by the usual fastening screws 8 which extend through apertures 9 formed in the end and top flanged edges of the plate.

The lowermost edge of the plate 5 is formed into a channel 10 extending throughout its length. In the channel, I secure a strip of rubber or the like as indicated at 11 for sealing the inner surface of the window against leakage of air and against dust and other foreign substances. The frictional resistance of the rubber against the window when being raised will indicate to an operator that the window has been raised or lowered to the approximate level of the lower edge of the plate.

Figure 5:
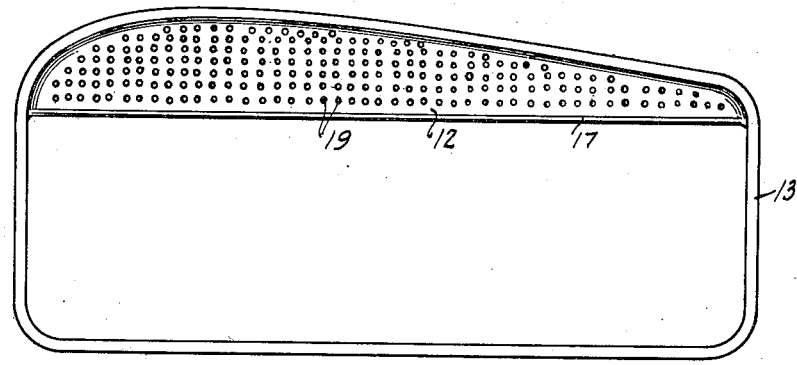
Figure 5 is a slightly enlarged side elevation of a modified form of the invention wherein the ventilator plate and molding are formed as an integral unit and which may be either removably secured to the window frame or permanently secured thereto by spot welding.
Figure 6:
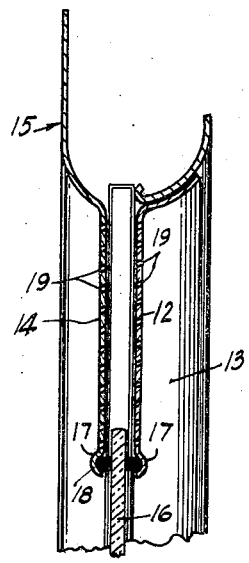
Figure 6 is an enlarged vertical section through a window frame showing the form of molding and ventilator illustrated in Figure 5 attached to one side of the window frame and cooperating with the opposite side thereof which is formed with an integral depending plate for cooperating with said molding and ventilator.
Figure 6:
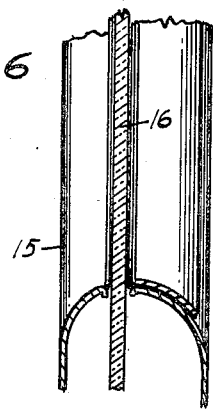

In Figure 5, I have shown the entire inside molding formed integral with the ventilator in the form of a plate or web 12 extending entirely across the upper end of the molding. The rim 13 of the molding may be suitably apertured to receive the usual fastening screws or the same may be spot welded to a car door during its process of manufacture. This inside molding may be used individually, or as shown in Figure 6, it may be combined with an outside web 14 formed integral with the frame portion of a vehicle door, generally indicated at 15, whereby the window glass 16 is movable between the two parallel webs or plates 12 and 14. The lowermost edges of said plates are channeled as at 17 and provided with rubber, weather stripping, or other sealing material, as indicated at 18. When raising the window the frictional engagement of its top edge with the weather stripping indicates to the operator that the window has been raised sufficiently to seal off the lower edges of the webs 12 and 14. The space above the top edge of the glass of course providing the desired ventilation through downwardly and outwardly inclined apertures 19 through the webs.

Although I have shown and described the ventilators as applied to windows and doors of a vehicle, it is to be understood that I do not wish to be limited to such use since obviously the invention is readily adaptable to all types of windows slidably mounted in a frame.

While I have shown a particular form of embodiment of my invention, I am aware that many minor changes therein will readily suggest themselves to others skilled in the art wthout departing from the spirit and scope of the invention. Having thus described the invention, what I claim as new and desire to protect by Letters Patent is:

A ventilator for a window movable in a frame having four sides, comprising in combination an exterior molding formed integral with the exterior surface of said frame, an apertured web formed integral with and extending across said exterior molding, an interior molding removably secured to the interior surface of said frame, a web formed integral and extending across said interior molding, downwardly and outwardly extending misaligned apertures formed in both of said webs, said webs being in spaced parallel relation to each other to provide passageway for said window therebetween, and weather stripping secured along the bottom edge of each of said webs and in wiping contact with said window.

PAUL J. KURILO.

REFERENCES CITED

The following references are of record in the file of this patent:

UNITED STATES PATENTS

| Number | Name | Date |
|---|---|---|
| 1,588,654 | Brownlee | June 15, 1926 |
| 1,664,829 | Parsons | Apr. 3, 1928 |
| 1,665,130 | Elliott | Apr. 3, 1928 |
| 1,678,743 | Miller | July 31, 1928 |
| 1,678,748 | Smith | July 31, 1928 |
| 1,723,995 | Ackerman | Aug. 13, 1929 |
| 1,745,186 | Parsons | Jan. 28, 1930 |
| 1,825,192 | Mace | Sept. 29, 1931 |
| 1,825,437 | Yeagle | Sept. 29, 1931 |
| 1,986,200 | Horton | Jan. 1, 1935 |